US012609462B2

(12) United States Patent
Yasuda

(10) Patent No.: US 12,609,462 B2
(45) Date of Patent: Apr. 21, 2026

(54) CABLE HOLDING MEMBER, CABLE HOLDING DEVICE INCLUDING CABLE HOLDING MEMBER, AND CABLE CONNECTOR DEVICE INCLUDING CABLE HOLDING DEVICE

(71) Applicant: HIROSE ELECTRIC CO., LTD., Kanagawa (JP)

(72) Inventor: Makoto Yasuda, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 426 days.

(21) Appl. No.: 18/313,114

(22) Filed: May 5, 2023

(65) Prior Publication Data

US 2023/0378664 A1 Nov. 23, 2023

(30) Foreign Application Priority Data

May 19, 2022 (JP) ................................ 2022-082397

(51) Int. Cl.

*H01R 4/2429* (2018.01)
*H01B 7/00* (2006.01)
*H01R 4/70* (2006.01)

(52) U.S. Cl.

CPC ......... *H01R 4/2429* (2013.01); *H01B 7/0045* (2013.01); *H01R 4/70* (2013.01)

(58) Field of Classification Search

CPC ...... H01R 4/2429; H01R 4/70; H01R 4/2433; H01R 13/506; H01R 13/5808;

(Continued)

(56) References Cited

U.S. PATENT DOCUMENTS 4,435,034 A * 3/1984 Aujla .................. H01R 4/2433 439/404
5,516,984 A * 5/1996 Soes .................. H01R 12/772 439/467

(Continued)

FOREIGN PATENT DOCUMENTS

JP 11-224723 A 8/1999
JP 2002313446 A * 10/2002
WO 2018/016389 A1 1/2018

OTHER PUBLICATIONS

English translation of JP2002313446A (Year: 2025).*
Japanese Office Action (JPOA) dated Dec. 1, 2025 for Japanese Patent Application No. 2022-082397; English machine translation.

*Primary Examiner* — Tulsidas C Patel
*Assistant Examiner* — Carlos E Lopez-Pagan
(74) *Attorney, Agent, or Firm* — RANKIN, HILL & CLARK LLP

(57) ABSTRACT

Provided is a cable holding device including: a housing includes a terminal having a crimping portion, a cable holding member includes an insertion hole and a guide portion, the crimping portion is insertable into the cable holding member through the insertion hole, the guide portion is provided in the insertion hole, has such a recessed shape that the crimping portion inserted into the insertion hole is fittable therein, and an inner wall of the guide portion includes a first inner wall and a second inner wall provided on a far side with respect to the first inner wall in the insertion hole, and a horizontal width of the second inner wall is set smaller than a horizontal width of the first inner wall such that the second inner wall restricts expansion of a horizontal width of the crimping portion when the crimping portion crimps the cable.

8 Claims, 14 Drawing Sheets

(58) Field of Classification Search
CPC ...... H01R 13/6581; H01R 13/58; H01R 4/24; H01B 7/0045
See application file for complete search history.

(56) References Cited

U.S. PATENT DOCUMENTS

| | | | | |
|---|---|---|---|---|
| 5,984,735 | A * | 11/1999 | Daoud | H01R 13/405 439/387 |
| 6,168,478 | B1 * | 1/2001 | Daoud | H01R 4/2429 439/854 |
| 6,283,793 | B1 | 9/2001 | Nakata | |
| 2019/0237898 | A1 * | 8/2019 | Naganuma | H01R 13/56 |

* cited by examiner

CABLE HOLDING MEMBER, CABLE HOLDING DEVICE INCLUDING CABLE HOLDING MEMBER, AND CABLE CONNECTOR DEVICE INCLUDING CABLE HOLDING DEVICE

CROSS-REFERENCE TO RELATED APPLICATION

This application claims priority from Japanese Patent Application No. 2022-082397 filed with the Japan Patent Office on May 19, 2022, the entire content of which is hereby incorporated by reference.

BACKGROUND

1. Technical Field

The present disclosure relates to a cable connector.

2. Related Art

For example, a cable connector device disclosed in JP-A-11-224723, i.e., a terminal unit, includes, as a cable holding member, a holding block holding a shield electric wire which is a cable and made of an insulating material, and further includes an insulating block to which a terminal is attached and a shield member covering the outside of the insulating block and the holding block. The shield electric wire includes, as in a general cable, an inner conductor and an insulating material covering the inner conductor.

SUMMARY

A cable holding device according to an embodiment of the present disclosure including: a housing; and a cable holding member, in which the housing includes a terminal having a crimping portion, the cable holding member includes an opening, a through-hole, an insertion hole, and a guide portion, the opening is formed in a first surface of the cable holding member, the through-hole is configured to hold the cable with the cable inserted from the first surface to a second surface, which faces the first surface, of the cable holding member through the opening, the insertion hole is formed in a third surface of the cable holding member parallel with a cable insertion direction, communicates with the through-hole, and is configured such that the crimping portion is insertable into the cable holding member through the insertion hole, the guide portion is provided in the insertion hole, has such a recessed shape that the crimping portion inserted into the insertion hole is fittable therein, and has a hole in which the cable is insertable and holdable therein, and an inner wall of the guide portion includes a first inner wall and a second inner wall provided on a far side with respect to the first inner wall in the insertion hole, and a horizontal width of the second inner wall is set smaller than a horizontal width of the first inner wall such that the second inner wall restricts expansion of a horizontal width of the crimping portion when the crimping portion crimps the cable.

DETAILED DESCRIPTION

Figure 1:
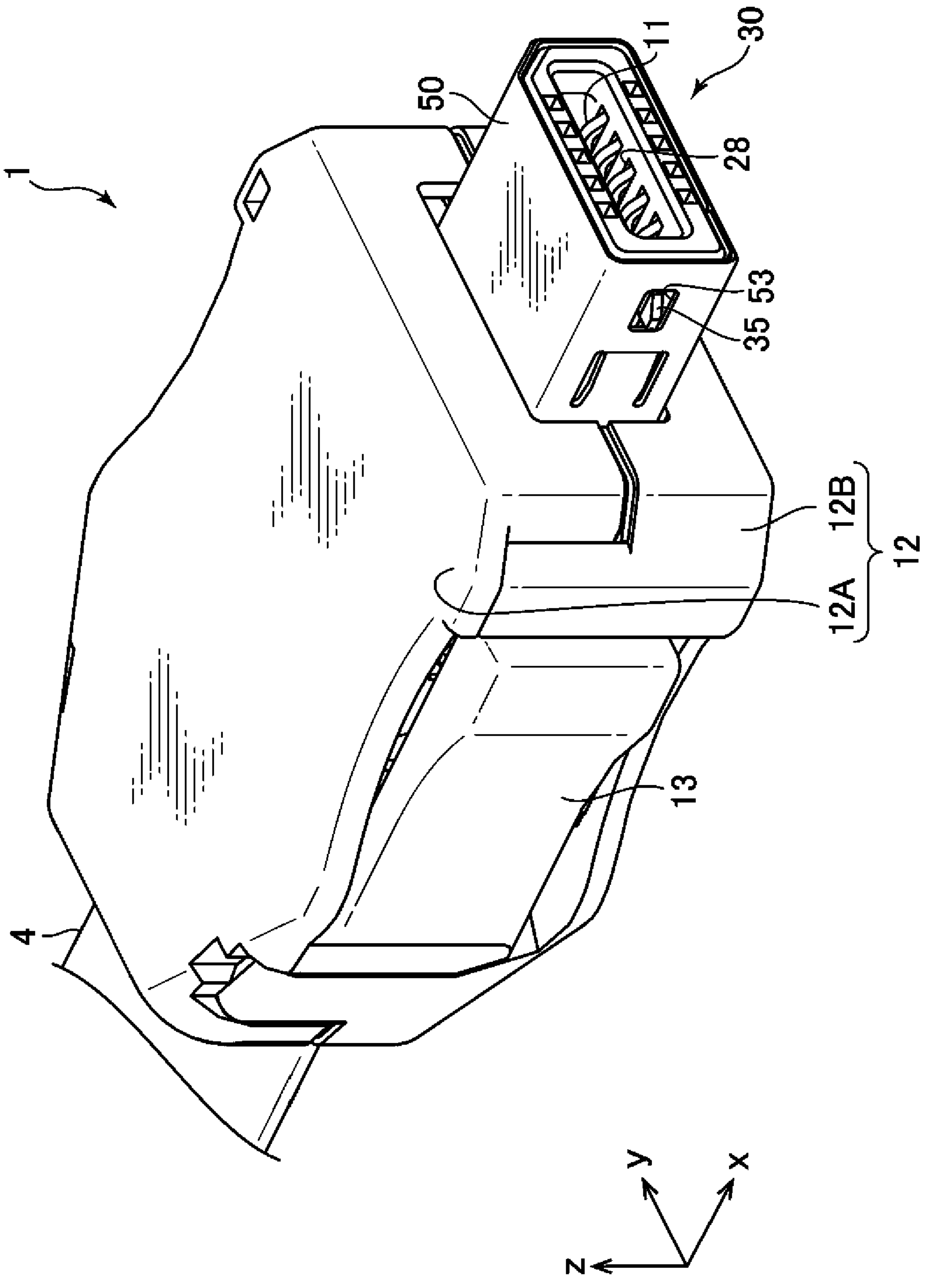
FIG. 1 is a perspective view of a cable connector device according to one preferable embodiment of the present disclosure, the cable connector device using a cable holding member according to one preferable embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the case of a cable having a high adhesion between a core wire and a cover for the core wire, sometimes when the cable with the cover is press-fitted in a crimping portion, the cover of the cable cannot be sufficiently broken with a crimping blade of the crimping portion, or the cable cannot be sandwiched with sufficient pressure due to expansion of the horizontal width of the crimping portion upon sandwiching of the cable by the crimping portion. In this case, contact resistance between the core wire of the cable and the crimping portion is high. As a result, when these portions are brought into conduction, there are e.g., problems that heat is easily caused, wasteful power consumption increases, and conduction failure is caused.

The present disclosure has been made in order to solve the above-described problems of the prior art, and an object thereof is to provide a cable holding member solving the above-described problems of the prior art and having an improved reliability of contact between a core wire and a crimping portion, a cable holding device including the cable holding member, and a cable connector device including the cable holding device.

In order to solve the above-described problem, a cable holding member according to an aspect of the present disclosure includes an opening, a through-hole, an insertion hole, and a guide portion. The opening is formed in a first surface of the cable holding member, the through-hole is configured to hold the cable with the cable inserted from the first surface to a second surface, which faces the first surface, of the cable holding member through the opening, the insertion hole is formed in a third surface of the cable holding member parallel with a cable insertion direction, communicates with the through-hole, and is configured such that a crimping portion that crimps the cable is insertable into the cable holding member through the insertion hole, the guide portion is provided in the insertion hole, has such a recessed shape that the crimping portion inserted into the insertion hole is fittable therein, and has a hole in which the cable is insertable and holdable therein, and an inner wall of the guide portion includes a first inner wall and a second inner wall provided on a far side with respect to the first inner wall in the insertion hole, and a horizontal width of the second inner wall is set smaller than a horizontal width of the first inner wall such that the second inner wall restricts expansion of a horizontal width of the crimping portion when the crimping portion crimps the cable.

According to the cable holding member, the cable holding device, and the cable connector device of this aspect, a cover of the cable can be broken with sufficient force by the crimping portion when the covered cable is crimped in the crimping portion. Moreover, a core wire in the cover can be sandwiched with sufficient force by the crimping portion. Thus, the reliability of contact between the core wire and the terminal including the crimping portion can be enhanced.

The guide portion capable of restricting expansion of the horizontal width of the crimping portion sandwiching the cable when the cable is crimped by the crimping portion is provided so that the reliability of contact between the core wire and the terminal including the crimping portion can be enhanced even in the cable having a high adhesion between the core wire and the cover for the core wire and electric connection between the core wire and the terminal can be more reliably made.

Hereinafter, an exemplary embodiment for carrying out the present disclosure will be described in detail with reference to the drawings. Note that the dimensions, materials, shapes, relative positions etc. of components described below in the embodiment are optional and are changeable according to a device configuration to which the present disclosure is applied or various conditions. For example, the present configuration is preferably applicable to, e.g., a cable connector disclosed in WO 2018/016389 A, and conversely, part of a configuration disclosed in WO 2018/016389 A is also applicable to the present configuration. Unless otherwise specifically described, the scope of the present disclosure is not limited to the embodiment specifically described below.

FIG. 1 shows a perspective view of a cable connector device 1 according to one preferable embodiment of the present disclosure, the cable connector device 1 using a cable holding member according to one preferable embodiment of the present disclosure.

In the present embodiment, the cable connector device 1 is formed as a plug connector. A partner connector device (not shown) to be fitted in the cable connector device 1 is formed as a receptacle connector. The partner connector device may be, for example, a board connector connected to a board or a cable connector as in the cable connector device 1.

The cable connector device 1 can be fitted in or be removed from the partner connector device along the direction of an arrow "x" in the figure. The cable connector device 1 and the partner connector device fitted in each other can be locked using a metal shell provided in each of the cable connector device 1 and the partner connector device. When the cable connector device 1 and the partner connector device are fitted in each other, a tapered tubular shell 50 provided in a shield shell 30 of the cable connector device 1 is inserted into a fitting hole provided in the shell of the partner connector device. At this point, lock protrusions 35 elastically protruding from holes 53 provided in the tubular shell 50 are fitted in through-holes which are lock target portions provided in the shell of the partner connector device. As a result, the cable connector device 1 and the partner connector device fitted in each other are locked. The lock state can be unlocked, for example, in such a manner that buttons 13 exposed through a resin case 12 are pushed into the cable connector device 1 along a "y" direction.

Figure 2:
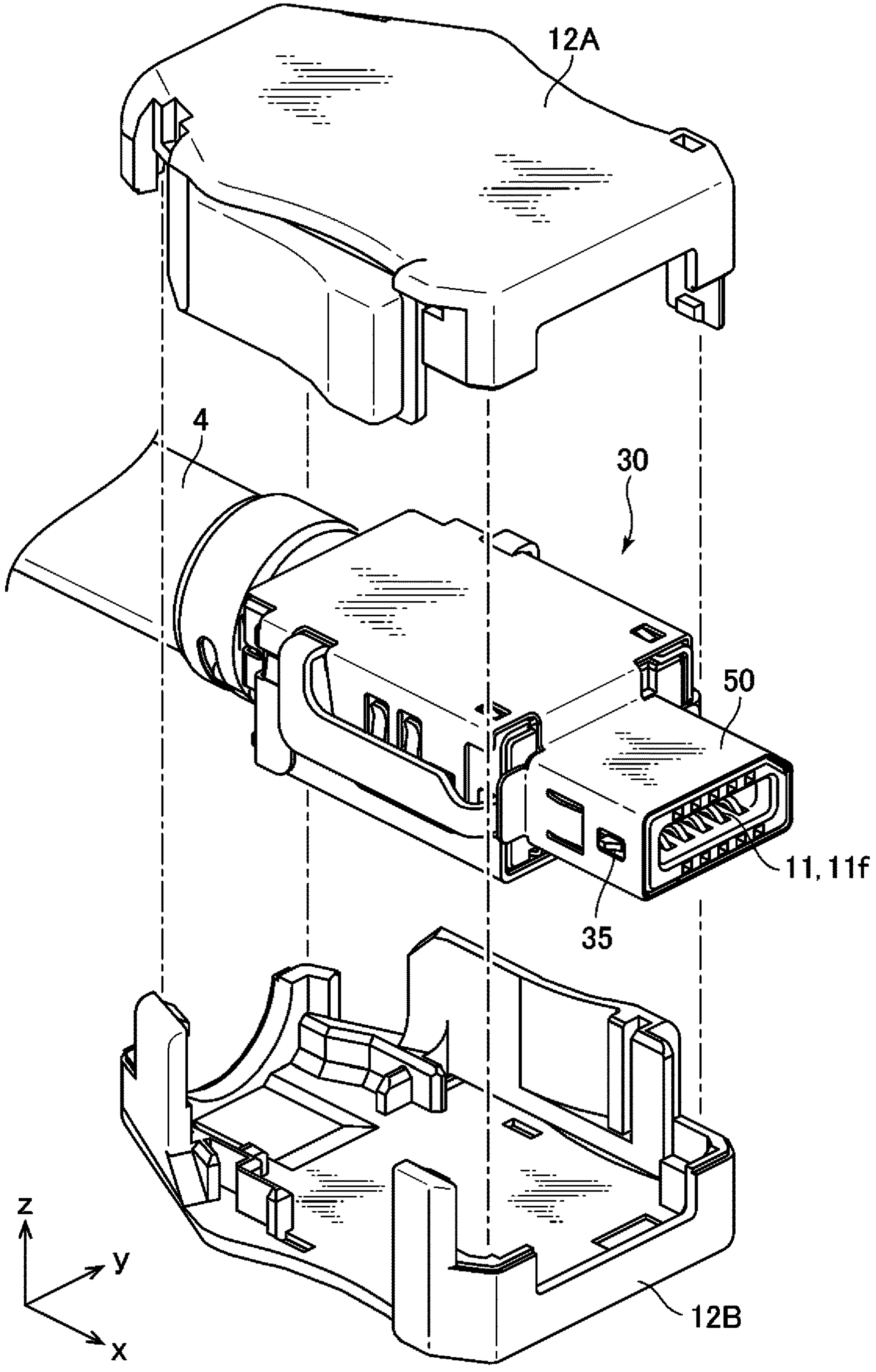
FIG. 2 is an exploded perspective view of the cable connector device of FIG. 1 in a state in which a case is detached from the cable connector device.
Figure 3:
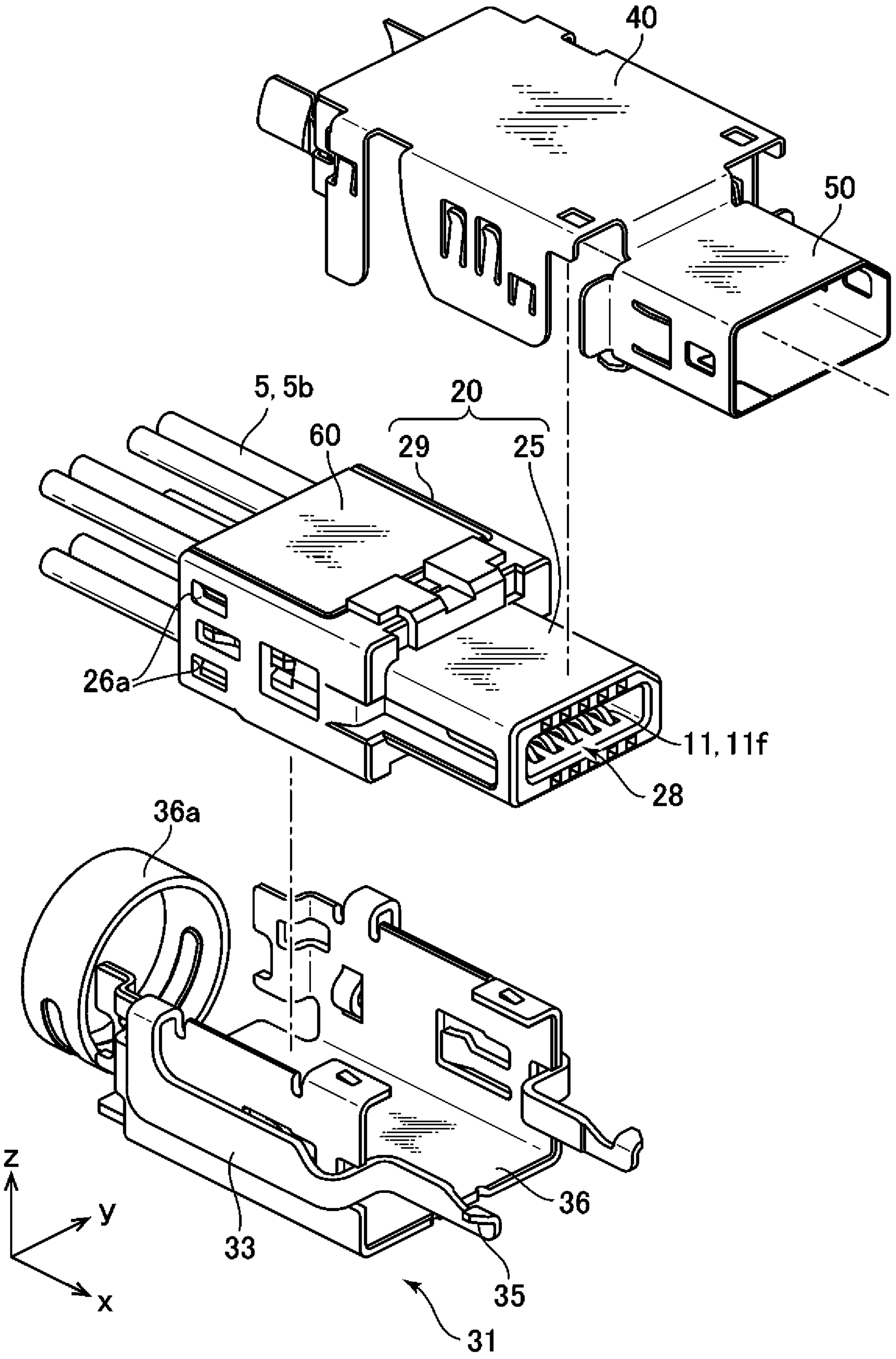
FIG. 3 is an exploded perspective view showing a state in which a shell is detached from the state of FIG. 2.
Figure 4A:
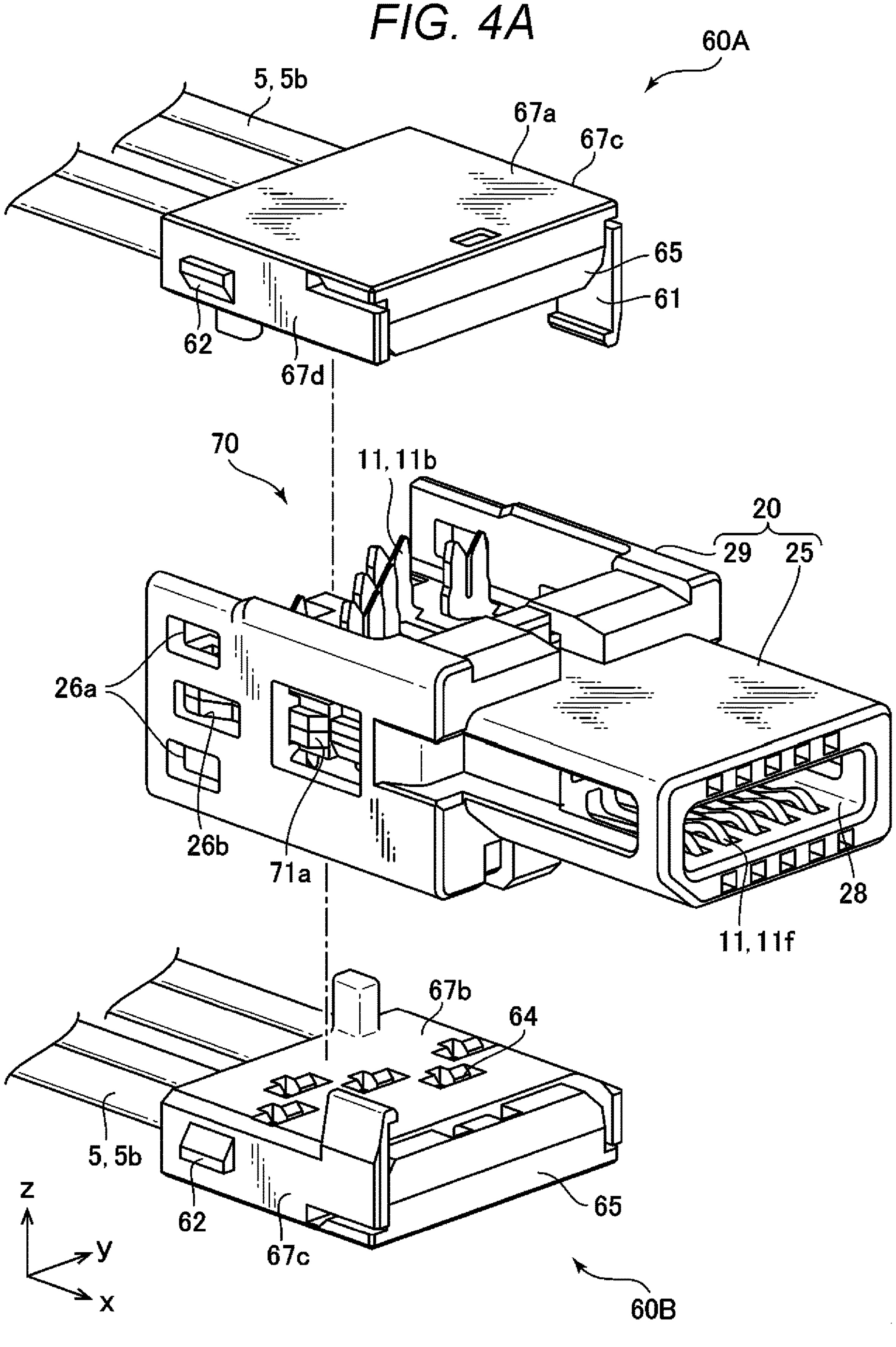
FIG. 4A is an exploded perspective view showing a state in which the cable holding member is detached from the state of FIG. 3.
Figure 4B:
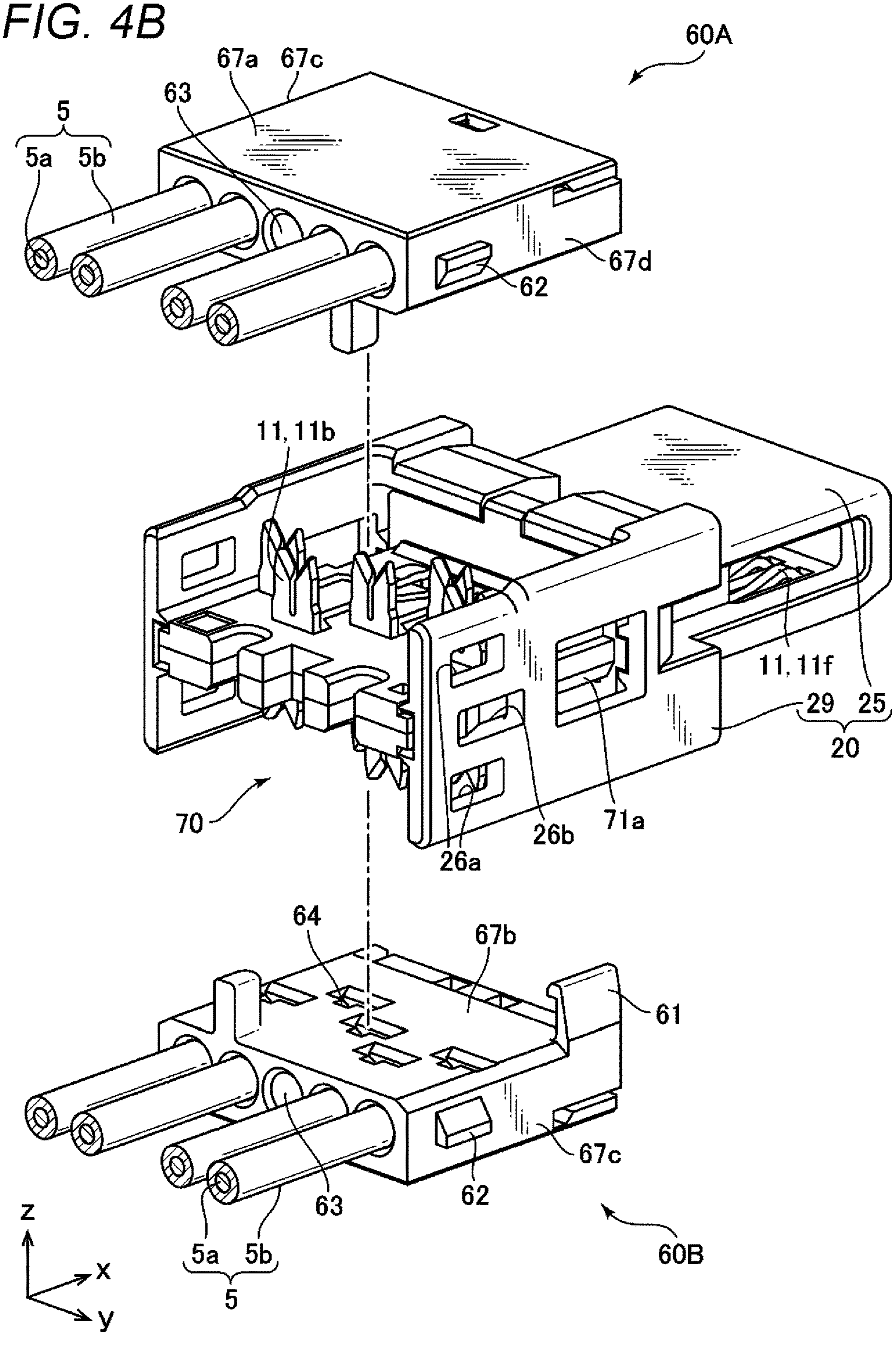
FIG. 4B is an exploded perspective view of the state of FIG. 4A from the rear side.

FIGS. 2, 3, 4A, and 4B show exploded perspective views of the cable connector device 1. FIG. 2 shows a state in which cases 12A, 12B (hereinafter, described with a character "A" or "B" only in a case where these cases need to be distinguished from each other) are detached from the cable connector device 1 of FIG. 1. FIG. 3 shows a state in which the shell 30 is further detached from the state of FIG. 2. FIGS. 4A and 4B show a state in which the cable holding member 60 is further detached from the state of FIG. 3.

The cable connector device 1 mainly includes the insulating cases 12A, 12B forming the outermost shell of the cable connector device 1, the metal shell 30 having an outer peripheral surface covered with these cases 12A, 12B, an insulating housing 20 having an outer peripheral surface covered with the shell 30, the insulating cable holding member 60 holding each of twisted pair cables 5 included in an electric cable 4, and an insulating terminal support 70 supporting terminals 11 attached to the housing 20. The twisted pair cable 5 is described as an example of the electric cable 4 in the present embodiment, but needless to say, the electric cable 4 is not limited to the twisted pair cable 5. The present cable connector device 1 is also applicable to various cables other than the twisted pair cable 5, needless to say. In description below, the twisted pair cable 5 will be sometimes referred to as a cable 5.

As clearly shown in FIG. 3, the shell 30 includes a body shell 31, a plate-shaped shell 40, and the tubular shell 50. The body shell 31 is formed in such a manner that a single metal plate is punched and bent. Similarly, each of the plate-shaped shell 40 and the tubular shell 50 is also formed in such a manner that another metal plate is punched and bent. The plate-shaped shell 40 and the body shell 31 are assembled to mainly cover an outer peripheral surface of a side portion of a housing body 29. The tubular shell 50 is entirely in a substantially rectangular tubular shape, and mainly covers an outer peripheral surface of a side portion of an insertion target portion 25 protruding from the housing body 29. The body shell 31 includes a base portion 36, a swaging portion 36*a* provided for the electric cable 4 so as to extend to the rear of the base portion 36, and elastic pieces 33 extending to the front of the base portion 36 and having free ends on the partner connector device fitting side. The lock protrusion 35 forming the lock to the partner connector device is provided at a tip end of each elastic piece 33. Note that the swaging portion 36*a* shown in FIG. 3 is in a state when the electric cable 4 is swaged, for the sake of convenience. Before the electric cable 4 is swaged, part of the swaging portion 36*a* is opened so that the electric cable 4 can be easily placed therein.

Figure 5:
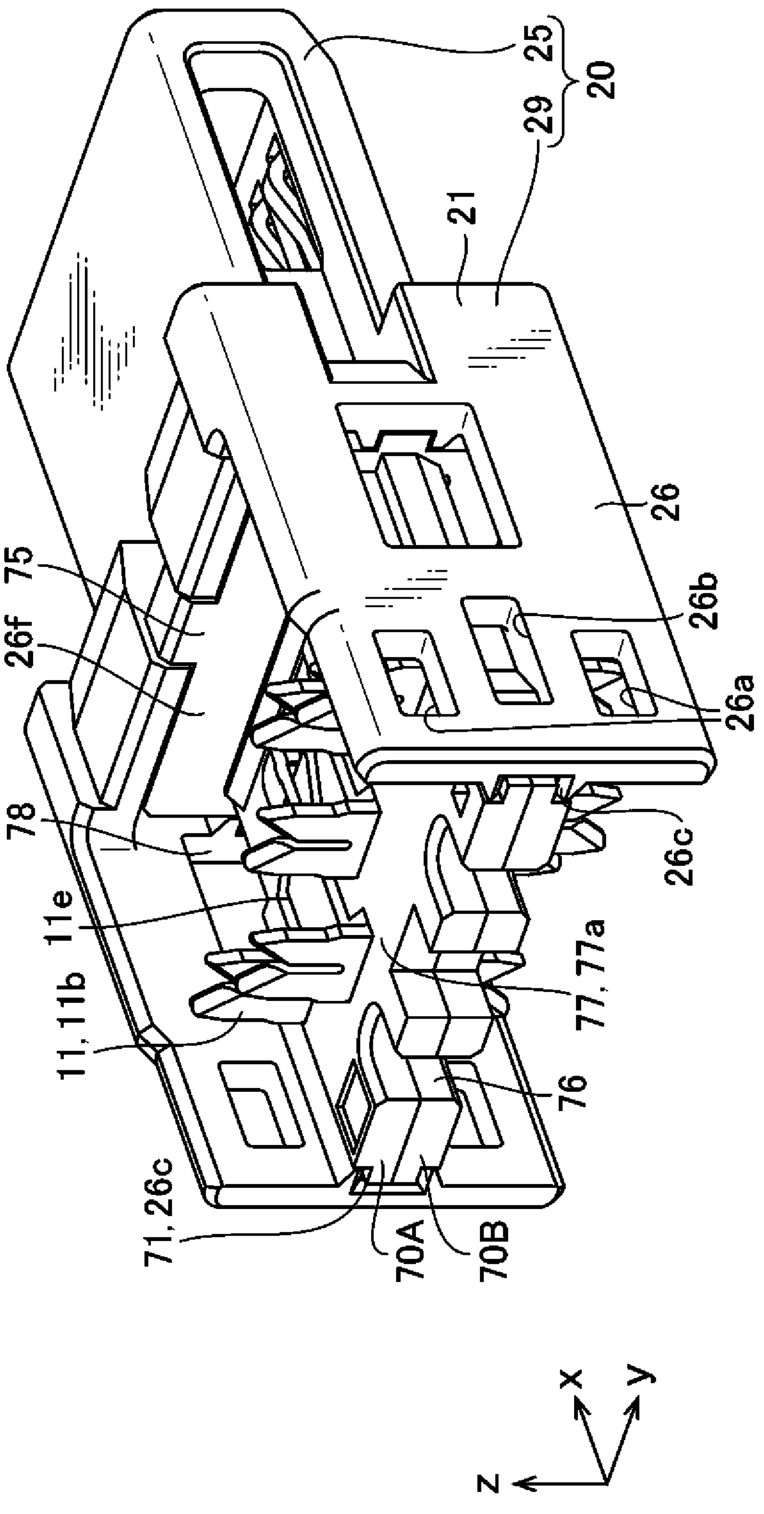
FIG. 5 is a perspective view from the rear side in a state in which a terminal support is attached to a housing.
Figure 6:
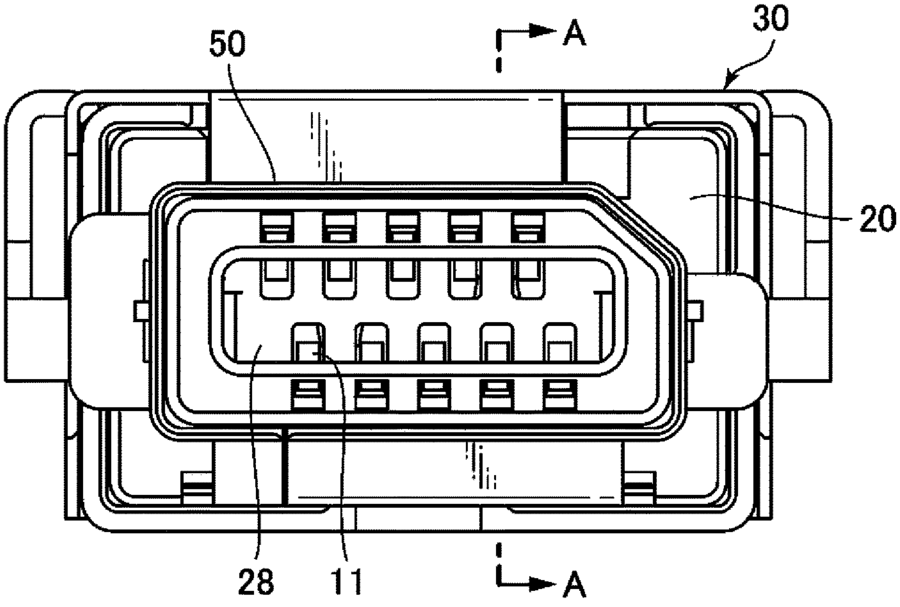
FIG. 6 is a front view showing a state in which the case is detached from the cable connector device.
Figure 7:
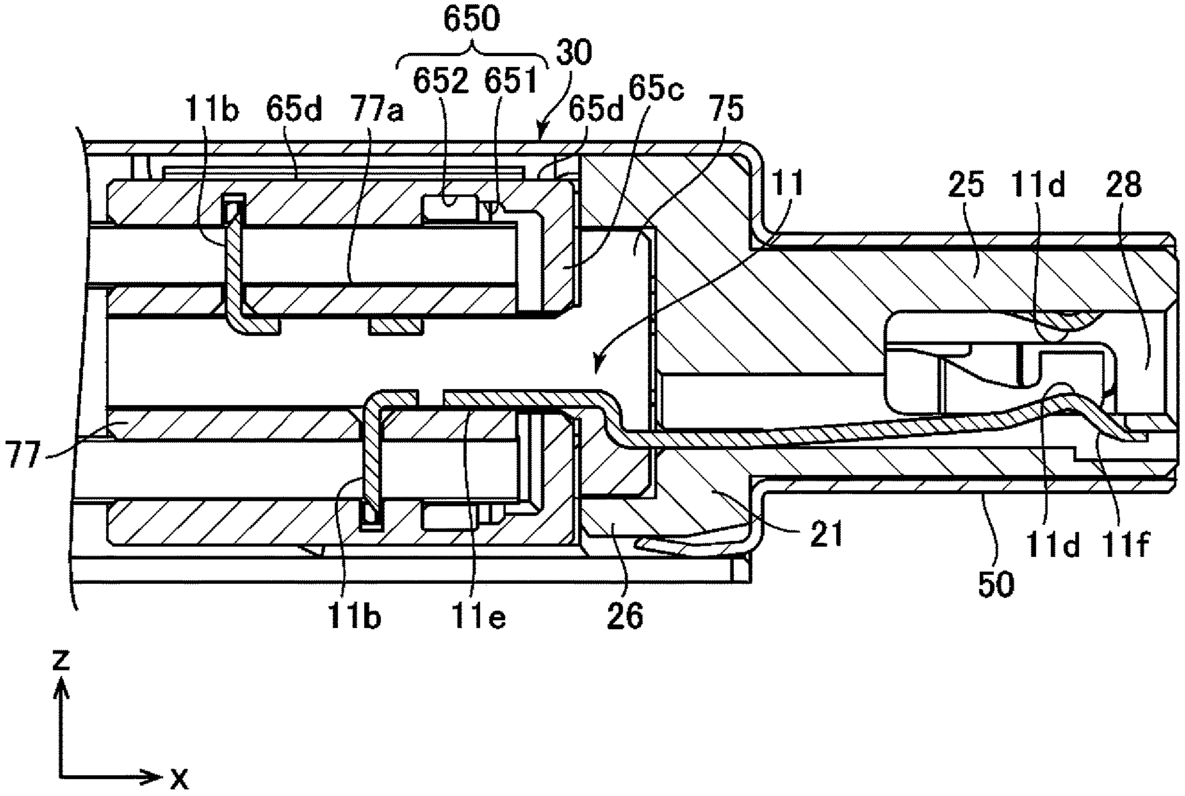
FIG. 7 is a sectional view along an A-A line of FIG. 6.

FIG. 5 shows a perspective view from the rear side in a state in which the terminal support 70 is attached to the housing 20. FIG. 6 shows a front view in a state in which cable holding members 60A, 60B and the shell 30 are further attached to the housing 20 which is in the state shown in FIG. 5, i.e., a state in which the cases 12A, 12B are detached from the cable connector device 1 as shown in FIG. 2. FIG. 7 shows a sectional view along an A-A line of FIG. 6.

The housing 20 is formed by integral molding from resin, and includes the housing body 29 and the insertion target portion 25 protruding from the housing body 29 to the partner connector device (not shown) fitting side. The housing body 29 is in a substantially rectangular parallelepiped shape when complemented by the terminal support 70 and the cable holding member 60. The insertion target portion 25 is a portion to be inserted into the fitting hole of the partner connector device together with the tubular shell 50, and a fitting recessed portion 28 into which a fitting raised portion (not shown) provided in the fitting hole of the partner connector device is to be inserted is formed in the insertion target portion 25.

The housing body 29 includes a thick base portion 21 and two opposing plate-shaped side walls 26 extending to the rear of the base portion 21, i.e., to the side opposite to the insertion target portion 25. In a space 26*f* formed between the two plate-shaped side walls 26, paired terminal supports 70A, 70B (hereinafter, described with a character "A" or "B" only when these supports need to be distinguished from each other; the same also applies to portions forming the terminal supports 70A, 70B) are placed together with the paired cable holding members 60A, 60B. In the present embodiment, the terminal supports 70A, 70B have the same size and shape. Similarly, the cable holding members 60A, 60B also have the same size and shape. These components are formed with the same sizes and shapes as described above so that component management can be facilitated and a manufacturing process can be simplified.

The terminal support 70 supports the multiple terminals 11 in a cantilever manner. The terminals 11 are incorporated into the terminal support 70 by integral molding upon manufacturing. Note that the terminals 11 may be incorporated into the terminal support 70 later by, e.g., press-fitting. Even after incorporation, part of the terminals 11 is exposed to the outside. For example, the vicinity of the front of the terminals 11, i.e., tip ends 11*f* of the terminals 11 extending to the side close to the base portion 21 of the housing 20, the rear of the terminals 11, i.e., crimping portions 11*b* of the terminals 11 to which the twisted pair cables 5 are to be crimped, and wiring portions 11*e* at the periphery of the crimping portions 11*b* remain exposed.

The terminal support 70 has a plate-shaped body 77. A standing portion 75 is provided on an upper surface 77*a* of the body 77. Lock protrusions 71*a* are each provided so as to extend outwardly from the right and left side surfaces of the body 77. Further, cutouts 76 cut out inwardly in a U-shape as viewed in plane are formed at the rear edge of the body 77.

First, when the terminal support 70 is attached to the housing 20, the paired terminal supports 70A, 70B face each other at flat bottom surfaces thereof in a predetermined direction. When the paired terminal supports 70A, 70B face each other, a gap into which a contact target such as the fitting raised portion provided in the fitting hole of the partner connector device is to be inserted may be formed among contacts 11*d* of the terminals 11 supported by the terminal support 70A and contacts 11*d* of the terminals 11 supported by the terminal support 70B. The tip ends 11*f* of the terminals 11 forming the contacts 11*d* are elastically deformable along a "z" direction so as to elastically contact the contact target (see FIG. 7). Thereafter, the paired terminal supports 70A, 70B facing each other are attached, with such a facing state kept, to the housing 20 along a direction parallel with the opposing surfaces of the terminal supports 70A, 70B. The terminal support 70 is guided to a predetermined position in the housing 20 in such a manner that the right and left side surfaces 71 of the terminal support 70 are slid to the housing 20 along guide grooves 26*c* provided in inner walls of the plate-shaped side walls 26. As a result, the lock protrusions 71*a* provided on the side surfaces 71 of the terminal support 70 are fitted in lock holes 26*b* provided in the plate-shaped side walls 26 of the housing 20, and accordingly, the terminal support 70 is locked to the housing 20.

The crimping portion 11*b* of the terminal 11 extends in the same direction as that of the standing portion 75, i.e., the "z" direction, on the upper surface 77*a* of the body 77 of the terminal support 70. The multiple terminals 11 each have the crimping portions 11*b*, and the multiple crimping portions 11*b* are arranged side by side in the "y" direction. In the present embodiment, the crimping portions 11*b* arranged in the "y" direction are alternately shifted from each other in the "x" direction. A tip end portion of the crimping portion 11*b* is bifurcated, and there is a groove between these bifurcated tip end portions. Each cable 5 held by the cable holding member 60 is press-fitted in this groove. An outer cover 5*b* of the cable 5 press-fitted in the groove is cut with a crimping blade provided in the groove. As a result, an exposed core wire 5*a* (see FIG. 8 etc.) which is an inner conductor is sandwiched in the groove of the crimping portion 11*b*, and the cable 5 and the terminal 11 are brought into conduction with each other. Accordingly, the multiple crimping portions 11*b* are each physically and electrically coupled to the multiple wiring portions 11*e*.

Figure 8A:
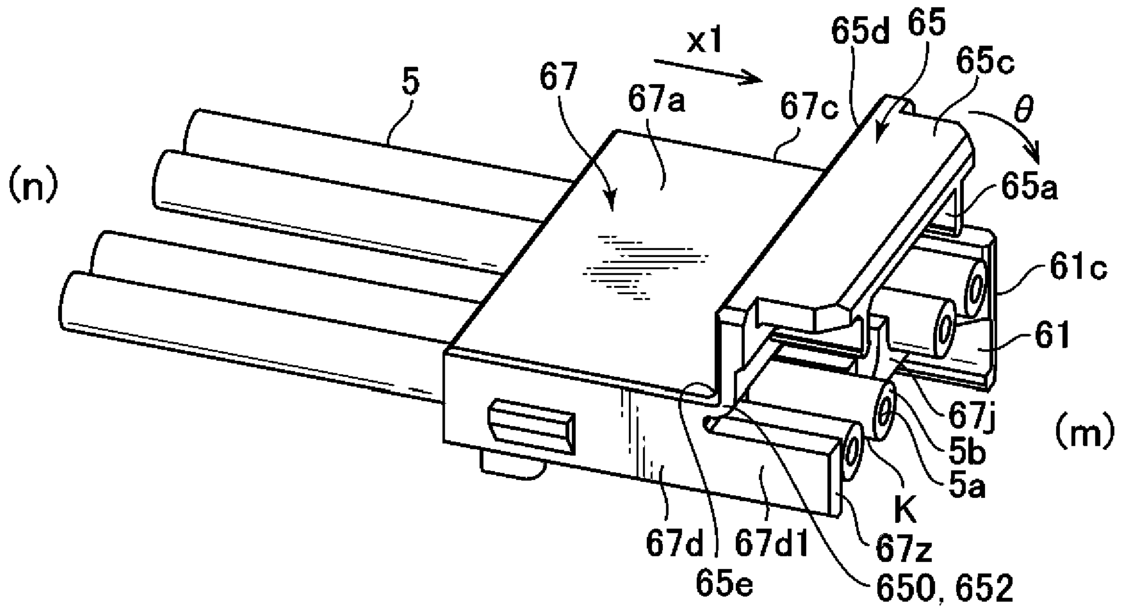
FIG. 8A is a perspective view showing a state before an opening is covered with a covering portion with the cable holding member holding cables.
Figure 8B:
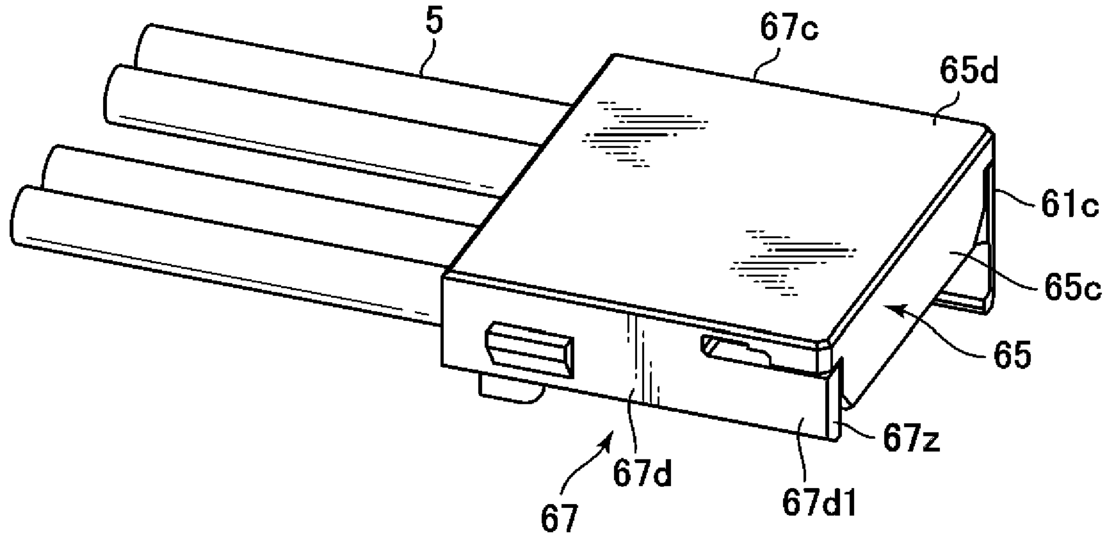
FIG. 8B is a perspective view showing a state after the opening has been covered with the covering portion with the cable holding member holding the cables.

An opening 63*a* in a first surface of a body 67 of the cable holding member 60 can be covered with a covering portion 65. FIG. 8A shows a state before the opening 63*a* (see FIG. 9) is covered with the covering portion 65, and FIG. 8B shows a state after the opening 63*a* has been covered with the covering portion 65. The covering portion 65 is a plate-shaped body forming part of the body 67. The covering portion 65 is bent in a θ direction along a bending portion 65*e* relative to the body 67 from the state of FIG. 8A, and in this manner, the opening 63*a* can be covered, as in the state of FIG. 8B, in a plane (a y-z plane) crossing a direction "x1" of inserting the cable 5.

In order to maintain the bent state of the covering portion 65, a locking unit is preferably provided between the body

67 and the covering portion 65. It is enough that the locking unit can maintain the bent state of the covering portion 65 relative to the body 67. For example, a raised portion may be provided in the covering portion 65, a recessed portion may be provided in the body 67, and these portions may be locked to each other. Conversely, a recessed portion may be provided in the covering portion 65, a raised portion may be provided in the body 67, and these portions may be locked to each other. Alternatively, a locking unit other than the raised and recessed portions may be used, and for example, an adhesive may be used.

Figure 9:
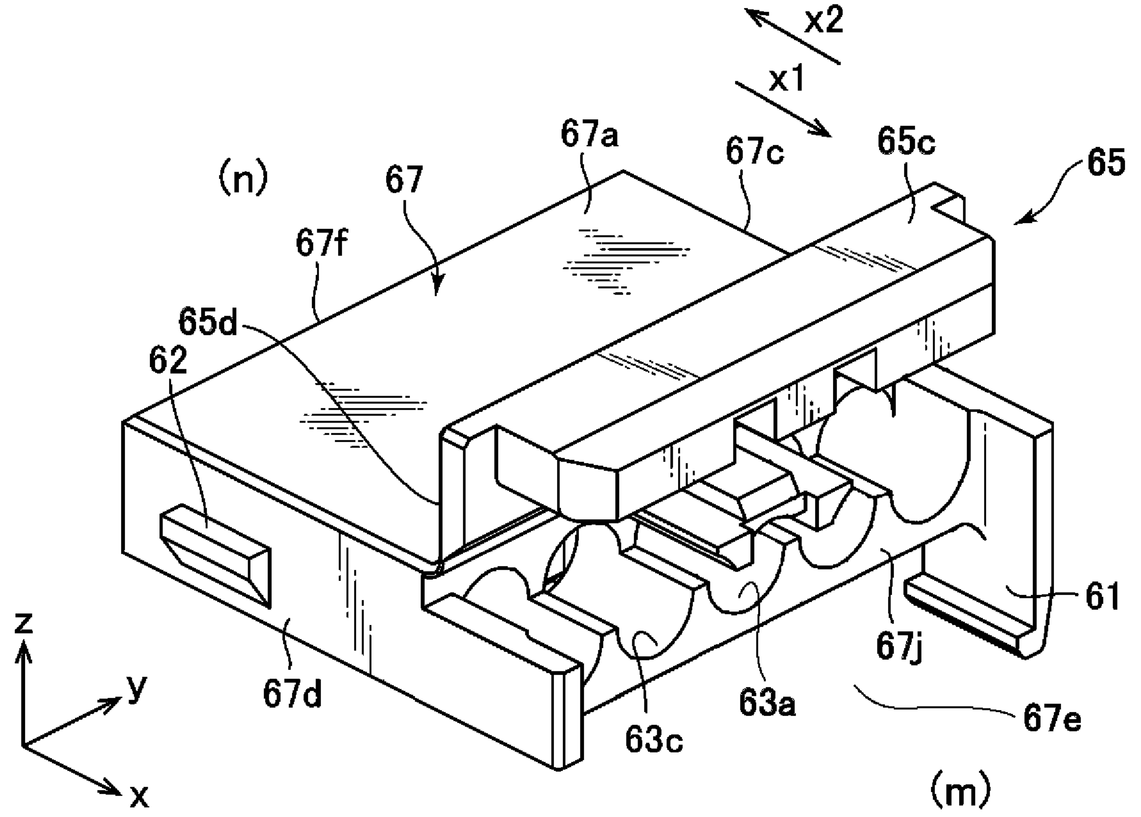
FIG. 9 is a perspective view of the cable holding member.
Figure 10:
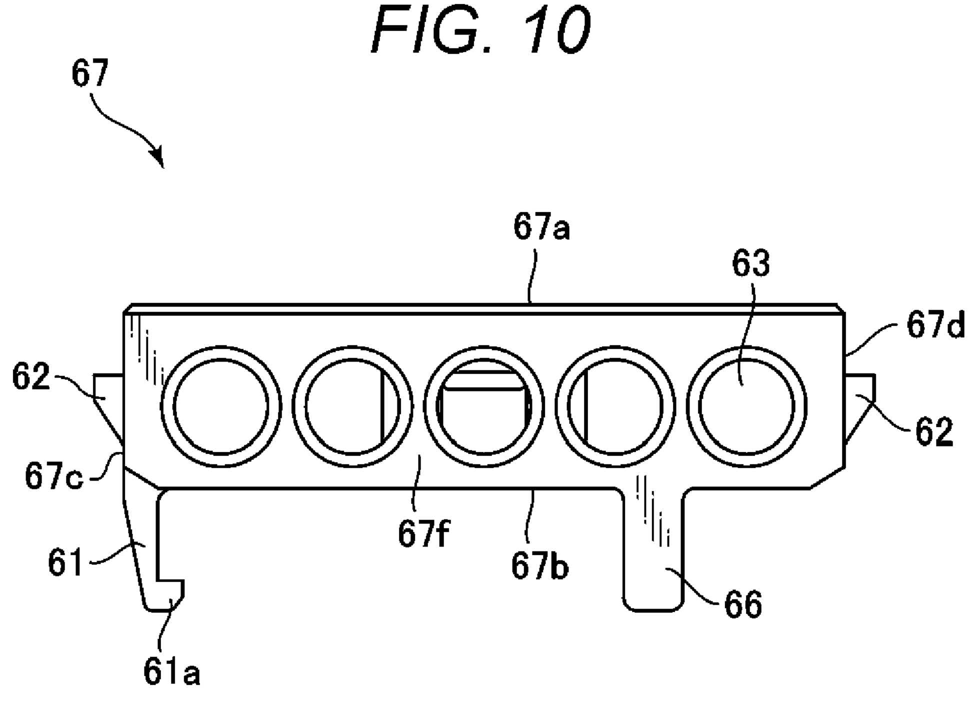
FIG. 10 is a back view of the cable holding member.
Figure 11:
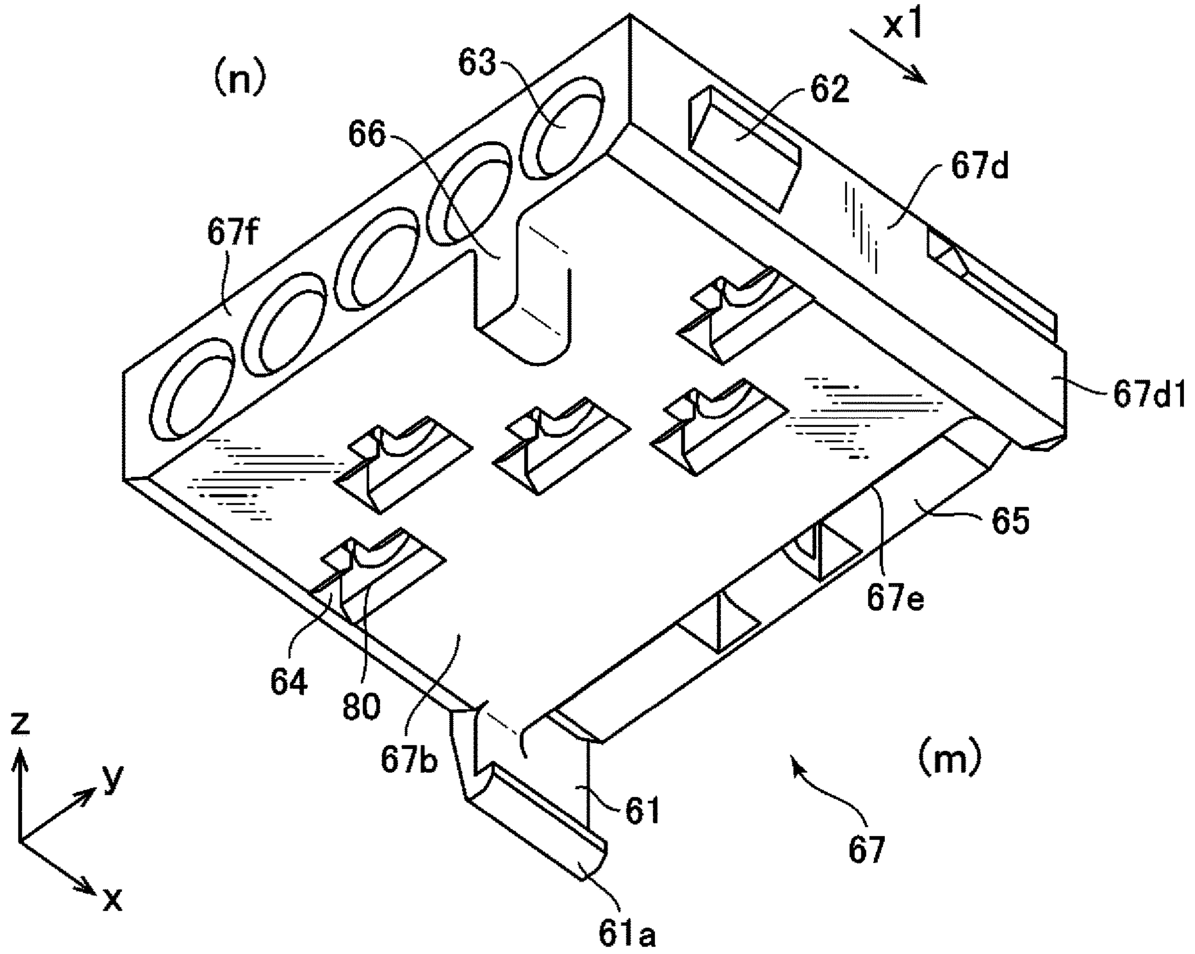
FIG. 11 is a perspective view of the cable holding member from the lower rear side.
Figure 12A:
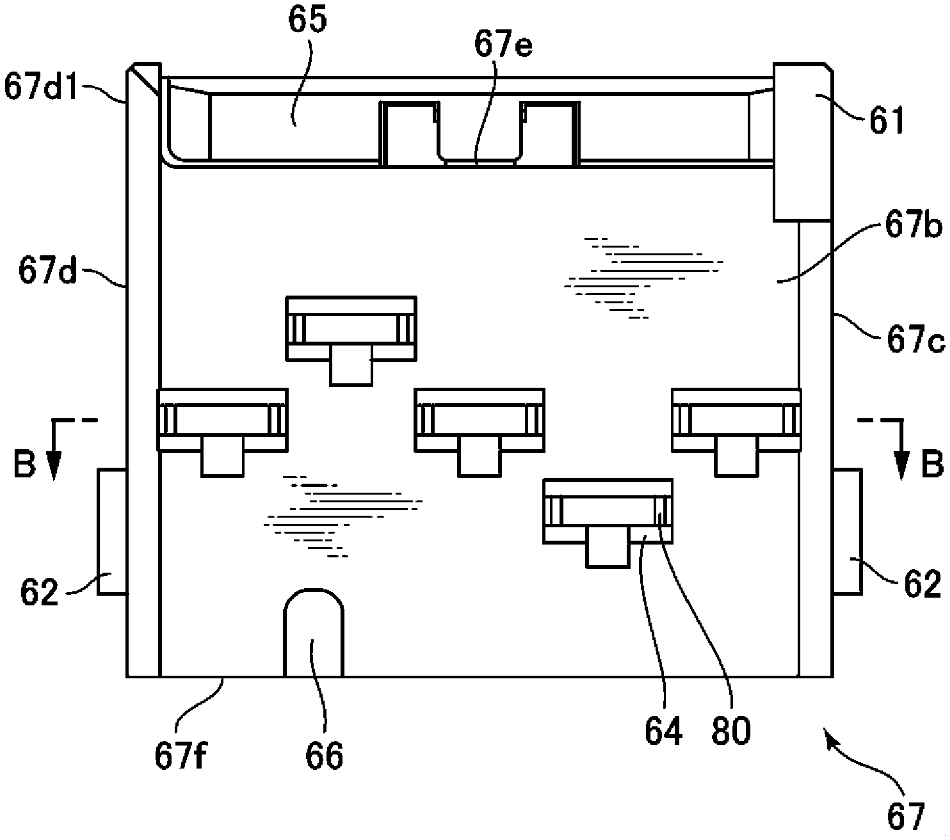
FIG. 12A is a bottom view of the cable holding member.
Figure 12B:
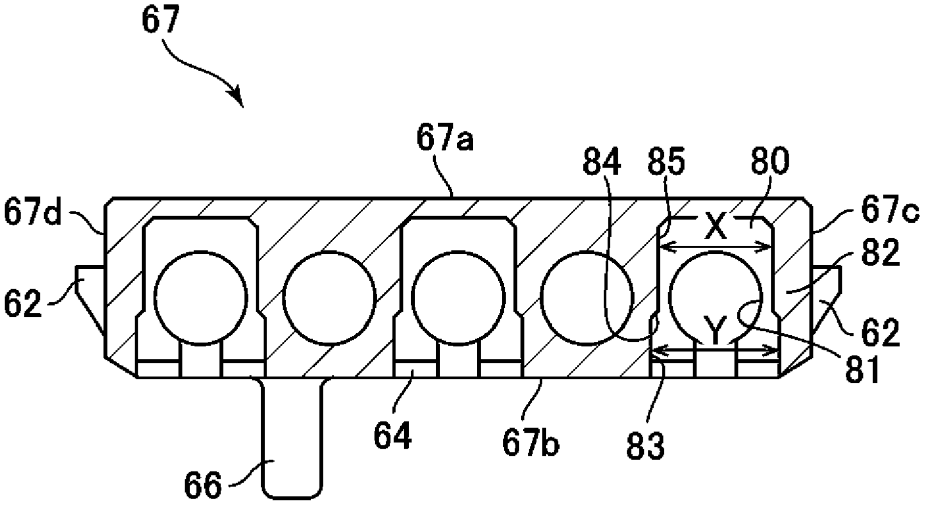
FIG. 12B is a sectional view along a B-B line of FIG. 12A.

FIGS. 9, 10, 11, and 12A show the state of the cable holding member 60 before attachment of the cables 5. FIG. 9 shows a perspective view of the cable holding member 60 in this state from the upper front side, FIG. 10 shows a back view, FIG. 11 shows a perspective view of the cable holding member 60 from the lower rear side, and FIG. 12A shows a bottom view. Moreover, FIG. 12B shows a sectional view along a B-B line shown in FIG. 12A.

The cable holding member 60 mainly includes, in the substantially rectangular parallelepiped body 67, the opening 63*a*, through-holes 63, insertion holes 64, and guide portions 80. The cable holding member 60 is formed by integral molding from resin.

As shown in FIG. 9, the first surface (a front surface 67*e* of the body 67 in the example of FIG. 9) of the body 67 of the cable holding member 60 includes the opening 63*a*.

As shown in FIGS. 10 and 11, the body 67 of the cable holding member 60 includes the through-holes 63 in a second surface (a rear surface 67*f* of the body 67 in the example of FIG. 11) facing the first surface (the front surface 67*e* of the body 67 in the example of FIG. 11) including the opening 63*a*. The body 67 of the cable holding member 60 includes the multiple through-holes 63 along the front-rear direction "x" so that the cables 5 can be held therein. Each through-hole 63 is included in the cable holding member 60 so as to penetrate the body 67 from the first surface (the front surface 67*e* of the body 67 in the example of FIG. 11) to the second surface (the rear surface 67*f* of the body 67 in the example of FIG. 11), and the cable 5 can be inserted through each through-hole 63 along the insertion direction "x1." As clearly shown in FIG. 9, these through-holes 63 have cross-sections in the shape of a semicircle or a quadrant in the vicinity of the first surface (the front surface 67*e* of the body 67 in the example of FIG. 9). In other words, in the first surface (the front surface 67*e* of the body 67 in the example of FIG. 9), the through-hole 63 has only the bottom, i.e., a cable mounting portion 63*c* on which the cable 5 is to be mounted, and is opened on the upper side. This upwardly-opened portion of the through-hole 63 can be covered with part of the covering portion 65, as described above. In other words, the upper portion of the through-hole 63 can be fully closed. The inner diameter of the through-hole 63 is set the substantially same as or slightly smaller than the outer diameter of the cable 5. With this configuration, an outer peripheral surface of the cable 5 and an inner peripheral surface of the through-hole 63 are caught on each other so that unexpected detachment of the cable 5 from the through-hole 63 can be reduced. Note that in the present embodiment, the multiple through-holes 63 are formed, but the multiple through-holes 63 are not necessarily formed and only one through-hole 63 may be formed.

As shown in FIG. 11, the body 67 of the cable holding member 60 includes the insertion holes 64, into which the crimping portions 11*b* (see FIG. 5) of the terminals 11 are to be inserted, in a third surface (a bottom surface 67*b* of the body 67 in the example of FIG. 11) parallel with the cable insertion direction "x1." The insertion hole 64 communicates with the through-hole 63, into which the cable 5 is to be inserted, in the body 67. When the cable holding member 60 is attached to the housing 20, the crimping portion 11*b* standing in the "z" direction on the terminal support 70 is inserted into the body 67 through the insertion hole 64. At this point, the cover 5*b* of the cable 5 inserted into the through-hole 63 can be cut with the crimping blade in the groove inside the crimping portion 11*b*. Note that in the present embodiment, the multiple insertion holes 64 are formed, but the multiple insertion holes 64 are not necessarily formed and only one insertion hole 64 may be formed. Moreover, in the present embodiment, the same number of insertion holes 64 as the number of crimping portions 11*b* standing relative to the housing 20 to which the cable holding member 60 is to be attached is formed. Further, as clearly shown in FIG. 12A, the insertion hole 64 is formed at such a position that the crimping portion 11*b* can be inserted thereinto when the cable holding member 60 is attached to the housing 20. That is, the insertion hole 64 is formed at such a position that the insertion hole 64 and the crimping portion 11*b* overlap with each other in the x direction and the y direction in the third surface (the bottom surface 67*b* of the body 67 in the present embodiment).

FIG. 12B shows the sectional view along the B-B line shown in FIG. 12A. The guide portion 80 is provided in a direction (the "z" direction in the example of FIG. 11) toward the inside of the body 67 in each insertion hole 64. As described above, the crimping portion 11*b* is inserted into the body 67 through the insertion hole 64 in the third surface (the bottom surface 67*b* of the body 67 in the example of FIG. 12A) of the body 67 of the cable holding member 60 when the cable holding member 60 is attached to the housing 20. At this point, the crimping portion 11*b* inserted into the insertion hole 64 is guided to the guide portion 80, and then, is fitted in the guide portion 80. Thus, the guide portion 80 has such a recessed shape that the crimping portion 11*b* can be fitted therein. Further, the horizontal width of an inner wall 82 of the guide portion 80 is greater than the horizontal width of the crimping portion 11*b* so that the crimping portion 11*b* can be fitted in the guide portion 80. With this configuration, the crimping portion 11*b* can be smoothly inserted into the guide portion 80 through the insertion hole 64, and be fitted in the guide portion 80. The guide portion 80 has a hole 81 so that the cable 5 inserted into the through-hole 63 can be held therein. The hole 81 is preferably formed with the substantially same diameter as that of the through-hole 63 on the substantially same axis as that of the through-hole 63. Note that in the present embodiment, the multiple guide portions 80 are provided, but the multiple guide portions 80 are not necessarily provided and only one guide portion 80 may be provided. In the present embodiment, the same number of guide portions 80 as the number of insertion holes 64 is provided.

The horizontal width of the inner wall 82 of the guide portion 80 is not necessarily the same horizontal width across the entirety of the inner wall 82, and the horizontal width of the guide portion 80 (the inner wall 82) may vary by region. For example, in the embodiment shown in FIG. 12B, the horizontal width of the inner wall 82 of the guide portion 80 varies by region in the guide portion 80. Regarding the region in the guide portion 80 and the horizontal width of the inner wall 82, the present embodiment will be described in detail with reference to FIG. 12B. As shown in FIG. 12B, the region in the guide portion 80 includes a region (hereinafter, referred to as an inlet-side region) on an inlet side when the crimping portion 11*b* is inserted into the guide portion 80 and a region (hereinafter, referred to as a far-side region) on a far side when the crimping portion 11*b* is inserted into the guide portion 80. The inner wall 82 in the inlet-side region is a first inner wall 83, and the inner wall 82 in the far-side region is a second inner wall 85. The first inner wall 83 is provided with a horizontal width Y, and the second inner wall 85 is provided with a horizontal width X. The first inner wall 83 (the inlet-side region) corresponds to the position of a tip end 11*g* of the crimping portion 11*b* at the start of insertion of the crimping portion 11*b* into the guide portion 80. Moreover, the second inner wall 85 (the far-side region) corresponds to the position of the tip end 11*g* of the crimping portion 11*b* at the end of insertion of the crimping portion 11*b* into the guide portion 80. Further, as the horizontal width of the inner wall 82 of the guide portion 80, the horizontal width Y of the first inner wall 83 is greater than the horizontal width X of the second inner wall 85 in the present embodiment.

Figure 13:
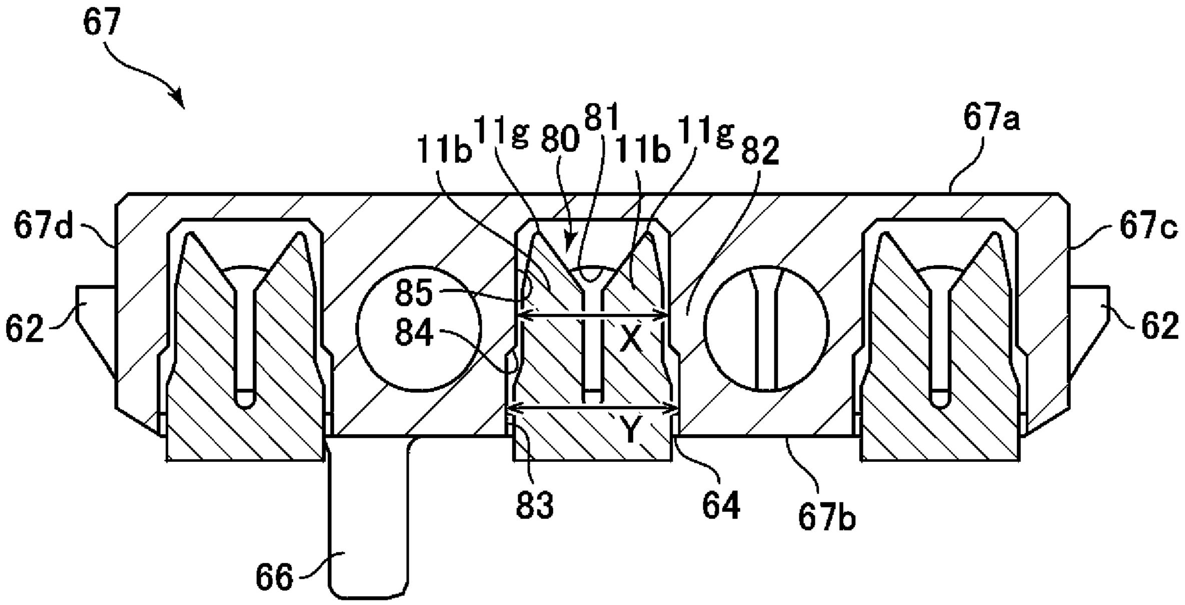
FIG. 13 is a sectional view along the B-B line in a state in which crimping portions are inserted into insertion holes of the cable holding member and are fitted in guide portions without the cable holding member holding the cables.

FIG. 13 shows a sectional view along the B-B line in a state in which the crimping portions 11*b* are inserted into the insertion holes 64 of the cable holding member 60 and are fitted in the guide portions 80 without the cable holding member 60 holding the cables 5. As shown in FIG. 13, the horizontal width X of the second inner wall 85 of the guide portion 80 is smaller than the horizontal width Y of the first inner wall 83, but is greater than the horizontal width of the crimping portion 11*b*. Thus, in a state in which the crimping portion 11*b* is fitted in the guide portion 80, the crimping portion 11*b* does not contact the second inner wall 85 of the guide portion 80. As described above, in a state in which the cable holding member 60 does not hold the cables 5, when the crimping portion 11*b* is guided and inserted into the guide portion 80, contact between the crimping portion 11*b* and the inner wall 82 of the guide portion 80, such as collision of part of the crimping portion 11*b* with the inner wall 82 of the guide portion 80, is less likely to be caused. Thus, the crimping portion 11*b* can be smoothly inserted into the insertion hole 64 of the cable holding member 60, and the crimping portion 11*b* can be smoothly fitted in the guide portion 80. This can prevent degradation of the inner wall 82 of the guide portion 80 and the crimping portion 11*b* due to excessive contact.

Figure 14A:
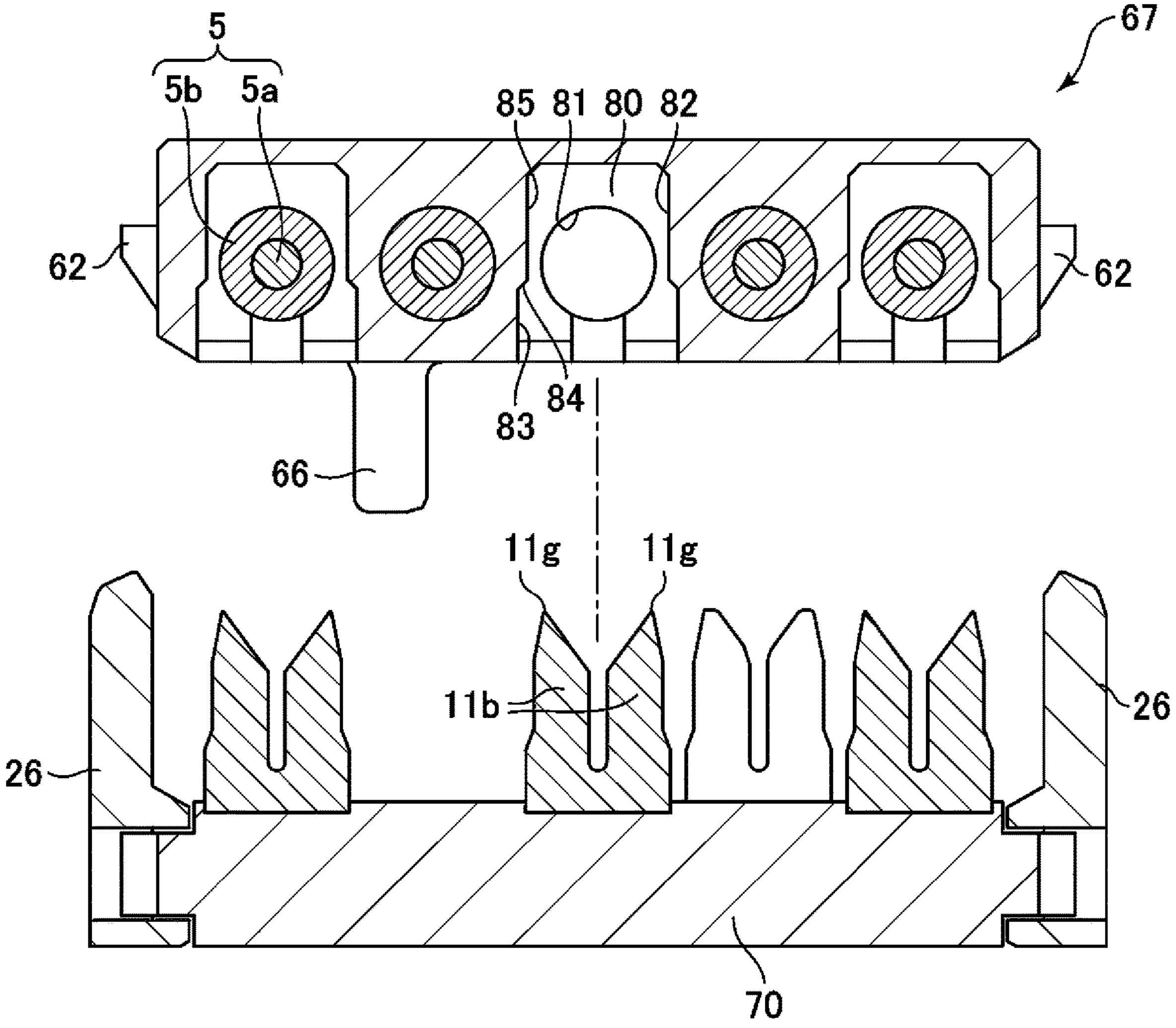
FIG. 14A is a sectional view along the B-B line in a state before the crimping portions are inserted into the insertion holes of the cable holding member with the cable holding member holding the cables.
Figure 14B:
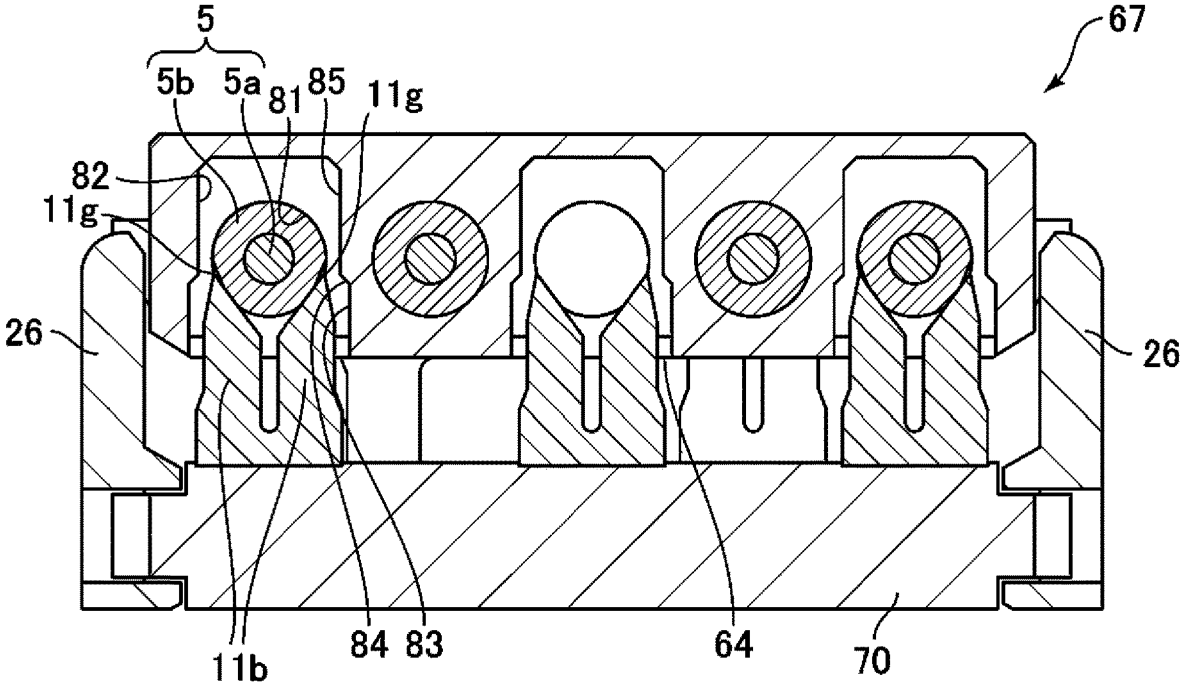
FIG. 14B is a sectional view along the B-B line in a state in which the crimping portions are inserted into the insertion holes of the cable holding member and contact the cables in the middle of fitting of the crimping portions in the guide portions with the cable holding member holding the cables.
Figure 14C:
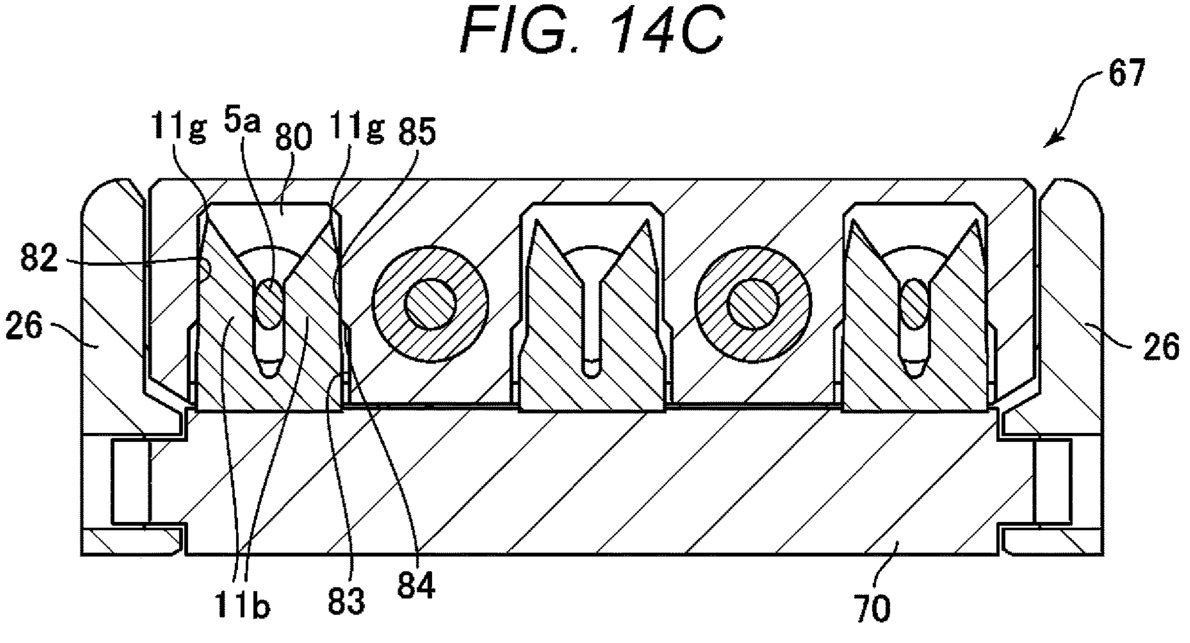
FIG. 14C is a sectional view along the B-B line in a state in which the crimping portions are inserted into the insertion holes of the cable holding member and are fitted in the guide portions with the cable holding member holding the cables

On the other hand, FIGS. 14A, 14B, and 14C show a state in a process of inserting the crimping portions 11*b* into the insertion holes 64 of the cable holding member 60 and fitting the crimping portions 11*b* in the guide portions 80 in a state in which the cable holding member 60 holds the cables 5. More specifically, FIG. 14A shows a sectional view along the B-B line in a state before the crimping portions 11*b* are inserted into the insertion holes 64 of the cable holding member 60. Moreover, FIG. 14B shows a sectional view along the B-B line in a state in which the crimping portions 11*b* are inserted into the insertion holes 64 of the cable holding member 60 and contact the cables 5 in the middle of fitting of the crimping portions 11*b* in the guide portions 80. Further, FIG. 14C shows a sectional view along the B-B line in a state in which the crimping portions 11*b* are further inserted into the insertion holes 64 of the cable holding member 60 from the state of FIG. 14B and are fitted in the guide portions 80.

As described above, in the present embodiment, the horizontal width of the inner wall 82 of the guide portion 80 varies by region in the guide portion 80. That is, the horizontal width Y of the first inner wall 83 (the inner wall 82 in the inlet-side region) is greater than the horizontal width X of the second inner wall 85 (the inner wall 82 in the far-side region). In other words, the horizontal width X of the second inner wall 85 (the inner wall 82 in the far-side region) is smaller than the horizontal width Y of the first inner wall 83 (the inner wall 82 in the inlet-side region).

Moreover, in the present embodiment, the inner wall 82, i.e., the first inner wall 83, of the guide portion 80 is provided across an area from the inlet of the guide portion 80 to the depth of the vicinity of the location of contact between the crimping portion 11*b* and the cable 5 held in the hole 81 of the guide portion 80. The inner wall 82, i.e., the second inner wall 85, of the guide portion 80 is provided across an area from the depth of the vicinity of the location of contact between the crimping portion 11*b* and the cable 5 held in the hole 81 of the guide portion 80 to the depth of the vicinity of the tip end 11*g* of the crimping portion 11*b* fitted in the guide portion 80.

Further, in the present embodiment, a boundary portion 84 is formed between the first inner wall 83 and the second inner wall 85 in the inner wall 82 of the guide portion 80, as illustrated in FIG. 14B. Specifically, the boundary portion 84 is formed at a boundary at which the horizontal width Y of the first inner wall 83 transitions to the horizontal width X of the second inner wall 85. The boundary portion 84 is formed at a position corresponding to the position of the tip end 11*g* of the crimping portion 11*b* at the time of contact of the crimping portion 11*b* with the cable 5 in the middle of fitting of the crimping portion 11*b* in the guide portion 80. That is, in the present embodiment, the inner wall 82 of the guide portion 80 on the inlet side with respect to the boundary portion 84 is provided as the first inner wall 83 having the horizontal width Y. On the other hand, the inner wall 82 of the guide portion 80 on the far side with respect to the boundary portion 84 is provided as the second inner wall 85 having the horizontal width X. The boundary portion 84 may be an inclined portion having an inclination as in the present embodiment. The boundary portion 84 is formed as the inclined portion so that collision with the tip end 11*g* of the crimping portion 11*b* can be avoided and the tip end 11*g* can be guided.

As shown in FIGS. 13 to 14C, the tip end portion of the crimping portion 11*b* is bifurcated into two right and left portions, and the groove is formed in an up-down direction between (inside) such the pair of right and left portions of the crimping portion 11*b*. Each of these tip end portions of the crimping portion 11*b* has the tip end 11*g*. In the state of FIG. 14C, the cable 5 is press-fitted in the groove inside the pair of the crimping portion 11*b*, and accordingly, each portion of the pair of the crimping portion 11*b* receives force in an outward direction. Thus, the tip ends of the pair of the crimping portion 11*b* open in the outward direction, and the horizontal width of the crimping portion 11*b* expands. As a result, the outside of each portion of the crimping portion 11*b* contacts the second inner wall 85 of the guide portion 80. In a state in which the outside of each portion of the pair of crimping portion 11*b* contacts the second inner wall 85 of the guide portion 80, pressing force acts from the outside of each portion of the pair of crimping portion 11*b* toward the second inner wall 85 of the guide portion 80. Accordingly, in the opposite direction thereof, i.e., an inward direction to each portion of the pair of crimping portion 11*b*, each portion of the pair of crimping portion 11*b* receives counteracting force from the second inner wall 85 of the guide portion 80. Thus, a force of the outside of the crimping portion 11*b* pressing the second inner wall 85 of the guide portion 80 and the counteracting force from the second inner wall 85 to the outside of the crimping portion 11*b* are balanced. As a result, the second inner wall 85 of the guide portion 80 can restrict expansion of the horizontal width of the crimping portion 11*b*, specifically expansion of the horizontal width between the pair of right and left portions of the crimping portion 11*b*.

In the state of FIG. 14C, when the crimping portion 11*b* crimps the cable 5 and breaks the cover 5*b* of the cable 5, if adhesion between the core wire 5*a* and the cover 5*b* of the cable 5 is high, a force of press-fitting the cable 5 into the crimping portion 11*b* is insufficient in the prior art. For this reason, in some cases, the cover 5*b* of the cable 5 cannot be sufficiently broken upon crimping, and the crimping portion 11*b* and the core wire 5*a* in the cover 5*b* cannot contact each other. On the other hand, in the present embodiment as shown in FIG. 14C, even if the adhesion between the core wire 5*a* and the cover 5*b* of the cable 5 is high as described above, when the cable 5 is press-fitted in the groove inside the pair of the crimping portion 11*b*, the counteracting force from the second inner wall 85 of the guide portion 80 acts on the crimping portion 11*b*, and therefore, the counteracting force acts in addition to the force upon press-fitting of the cable 5 in the crimping portion 11*b*, as described above. Accordingly, the cable 5 can be crimped with sufficient force. As a result, the cover 5*b* of the cable 5 can be broken with sufficient force.

In the state of FIG. 14C, when the crimping portion 11*b* is fitted in the guide portion 80 and the cable 5 is sandwiched in the crimping portion 11*b*, the crimping portion 11*b* also receives the counteracting force from the second inner wall 85 of the guide portion 80, as described above. Accordingly, the counteracting force in the inward direction acts on each side of the crimping portion 11*b* in addition to a force of the crimping portion 11*b* sandwiching the cable 5. Thus, the crimping portion 11*b* can sandwich the cable 5 with sufficient force. As a result, the core wire 5*a* exposed due to breakage of the cover 5*b* by the above-described crimping and the crimping portion 11*b* can reliably contact each other. That is, the reliability of contact between the core wire 5*a* of the cable 5 and the terminal 11 including the crimping portion 11*b* can be enhanced, and therefore, electric connection between the core wire 5*a* and the terminal 11 can be more reliably made.

As clearly shown in FIG. 11, a protrusion 66 to be fitted in the cutout 76 (see FIG. 5) provided in the terminal support 70 when the cable holding member 60 is attached to the housing 20 is also provided on the bottom surface 67*b* of the body 67. The protrusion 66 stands along the direction "z" along a direction of attaching the cable holding member 60 to the housing 20 on a surface of the cable holding member 60 attached to the housing 20, i.e., the bottom surface 67*b* of the cable holding member 60.

A locking protrusion 62 to be locked to a locking hole 26*a* (see FIGS. 4A, 4B, and 5) provided in the plate-shaped side wall 26 of the housing 20 is provided on one end side (n) in the front-rear direction "x" on each of side surfaces 67*c*, 67*d* of the body 67. Upon attachment of the cable holding member 60 to the housing 20, the locking protrusions 62 are fitted in the locking holes 26*a* so that the cable holding member 60 can be locked to the housing 20.

On the other hand, on the other end side (m) in the front-rear direction "x" at each of the side surfaces 67*c*, 67*d*, an extending portion (61, 67*d*1) extending to one end side (n) or the other end side (m) of the through-hole 63 with respect to an opening end surface 67*j* of the opening 63*a* along the direction "x1" of inserting the cable 5 is formed. Specifically, the extending portion provided at the side surface 67*c* is formed by part of an arm portion 61. These extending portions (61, 67*d*1) are arranged so as to face each other with respect to the opening end surface 67*j* of the opening 63*a*, and end surfaces 61*c*, 67*z* of these extending portions (61, 67*d*1) are adjusted to positions in the "y-z plane" crossing the direction "x1" of inserting the cable 5 into the through-hole 63. With these end surfaces 61*c*, 67*z*, the cover 5*b* of the cable 5 can be easily cut at a predetermined position (see FIGS. 8A and 8B).

The arm portion 61 forming the extending portion of the side surface 67*c* extends, as in the protrusion 66, downwardly from the bottom surface 67*b* in the direction "z" along a direction of attaching the cable holding member 60 to the housing 20. In the vicinity of a free end of the arm portion 61, a locking protrusion 61*a* to be locked to part of the body 77 of the terminal support 70 is provided. As in the locking protrusion 62, the arm portion 61 is a portion to be used, e.g., for fixing the cable holding member 60 to the housing 20, and is locked to part of the body 77 of the terminal support 70 with inserted into a hole 78 (see FIG. 5) which is formed by the housing 20 and the terminal support 70. In order to facilitate locking, the arm portion 61 is provided elastically deformable in a plate thickness direction.

The cable holding member 60 is attached to the housing 20 after attachment of the terminal support 70 to the housing 20, i.e., to the housing 20 in the state of FIGS. 4A, 4B, and 5. The cable holding member 60 can be attached to the housing 20 in such a manner that, e.g., a force of simultaneously sandwiching upper surfaces 67*a* of the opposing paired cable holding members 60A, 60B (see FIGS. 4A and 4B) is temporarily applied using a finger tip or a tool after the cable holding member 60 has been positioned relative to the housing 20. Using such force, the cable 5 can be cut with the crimping portion 11*b*, and be fixed to a predetermined position in the housing 20 and the cable holding member 60.

As described above, the cable holding device of the present disclosure includes the housing and the cable holding member. The housing includes the housing body and the insertion target portion. The housing body includes the terminals having the crimping portions and a terminal support supporting the terminals. The cable holding member includes, in the body thereof, the opening, the through-holes, the insertion holes, and the guide portions. The opening is included in the first surface of the body. The through-hole is configured to hold the cable with the cable inserted from the first surface to the second surface, which faces the first surface, of the body through the opening. The insertion hole is included in the third surface parallel with the cable insertion direction, communicates with the through-hole, and is configured such that the crimping portion is insertable into the body through the insertion hole. The guide portion has such a recessed shape that the crimping portion inserted into the insertion hole is fittable therein, and has the hole in which the cable is insertable and holdable therein. The horizontal width of the inner wall of the guide portion is greater than the horizontal width of the crimping portion, and the horizontal width of the first inner wall which is the inner wall of the guide portion corresponding to the tip end of the crimping portion at the start of insertion of the crimping portion is greater than the horizontal width of the second inner wall which is the inner wall of the guide portion corresponding to the tip end of the crimping portion at the end of insertion of the crimping portion. When the crimping portion is inserted through the insertion hole and is fitted in the guide portion, in a state in which the guide portion holds the cable, the second inner wall of the guide portion restricts expansion of the horizontal width of the crimping portion due to crimping of the cable by the crimping portion. On the other hand, in a state in which the guide portion does not hold the cable, the crimping portion does not contact the inner wall of the guide portion.

Note that the present disclosure is not limited to the above-described embodiment and various other changes can be made. The drawings and description of the present application are merely an example, and the present disclosure is not limited thereto.

It is obvious that those skilled in the art in the field relating to the present disclosure arrive at many modifications and other embodiments of the present disclosure based on the teaching described above and can modify and amend the present disclosure without departing from the scope or gist of the present disclosure. Thus, it shall be understood that the present disclosure is not limited only to the embodiment disclosed and the present disclosure includes modifications and other embodiments in the scope of the attached claims. Although specific terms are used in the present specification, these terms are not used in a limited manner, but are merely used as general and descriptive meanings.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A cable holding device comprising:

a housing; and a cable holding member, wherein the housing includes a terminal having a crimping portion, the cable holding member includes an opening, a through-hole, an insertion hole, and a guide portion, the opening is formed in a first surface of the cable holding member, the through-hole is configured to hold a cable with the cable inserted from the first surface to a second surface, which faces the first surface, of the cable holding member through the opening, the insertion hole is formed in a third surface of the cable holding member parallel with a cable insertion direction, communicates with the through-hole, and is configured such that the crimping portion is insertable into the cable holding member through the insertion hole, the guide portion is provided in the insertion hole, has such a recessed shape that the crimping portion inserted into the insertion hole is fittable therein, and has a hole in which the cable is insertable and holdable therein, and an inner wall of the guide portion includes a first inner wall, a second inner wall provided on a far side with respect to the first inner wall in the insertion hole, and a boundary portion formed between the first inner wall and the second inner wall, a horizontal width of the second inner wall is set smaller than a horizontal width of the first inner wall such that the second inner wall restricts expansion of a horizontal width of the crimping portion when the crimping portion crimps the cable, and the boundary portion is an inclined portion having an inclination with respect to the first inner wall such that a horizontal width of the boundary portion gradually decreases from the horizontal width of the first inner wall to the horizontal width of the second inner wall, and the first inner wall, the boundary portion and the second inner wall cover a portion of the crimping portion where the crimping portion crimps the cable.

2. A cable connector device comprising:

the cable holding device according to claim 1;

a shell covering an outer peripheral surface of the cable holding device; and a case covering an outer peripheral surface of the shell.

3. The cable holding device according to claim 1, wherein the first inner wall is provided across an area from an inlet of the guide portion to a depth of a vicinity of a location of contact between the crimping portion and the cable held in the hole of the guide portion, the second inner wall is provided across an area from the depth of the vicinity of the location of contact between the crimping portion and the cable held in the hole of the guide portion to a depth of a vicinity of a tip end of the crimping portion fitted in the guide portion, and the boundary portion is formed at a position corresponding to a position of the tip end of the crimping portion at the time of contact of the crimping portion with the cable in the middle of fitting of the crimping portion in the guide portion.

4. The cable holding device according to claim 1, wherein the first inner wall is provided across an area from an inlet of the guide portion to a depth of a location of contact between the crimping portion and the cable held in the hole of the guide portion, the second inner wall is provided across an area from the depth of the location of contact between the crimping portion and the cable held in the hole of the guide portion to a depth of a tip end of the crimping portion fitted in the guide portion, and the boundary portion is formed at a position corresponding to a position of the tip end of the crimping portion at the time of contact of the crimping portion with the cable in the middle of fitting of the crimping portion in the guide portion.

5. A cable holding member including an opening, a through-hole, an insertion hole, and a guide portion, wherein the opening is formed in a first surface of the cable holding member, the through-hole is configured to hold a cable with the cable inserted from the first surface to a second surface, which faces the first surface, of the cable holding member through the opening, the insertion hole is formed in a third surface of the cable holding member parallel with a cable insertion direction, communicates with the through-hole, and is configured such that a crimping portion that crimps the cable is insertable into the cable holding member through the insertion hole, the guide portion is provided in the insertion hole, has such a recessed shape that the crimping portion inserted into the insertion hole is fittable therein, and has a hole in which the cable is insertable and holdable therein, and an inner wall of the guide portion includes a first inner wall, a second inner wall provided on a far side with respect to the first inner wall in the insertion hole, and a boundary portion formed between the first inner wall and the second inner wall, a horizontal width of the second inner wall is set smaller than a horizontal width of the first inner wall such that the second inner wall restricts expansion of a horizontal width of the crimping portion when the crimping portion crimps the cable, the boundary portion is an inclined portion having an inclination with respect to the first inner wall such that a horizontal width of the boundary portion gradually decreases from the horizontal width of the first inner wall to the horizontal width of the second inner wall, and the first inner wall, the boundary portion and the second inner wall cover a portion of the crimping portion where the crimping portion crimps the cable.

6. The cable holding member according to claim 5, wherein the first inner wall is provided across an area from an inlet of the guide portion to a depth of a vicinity of a location of contact between the crimping portion and the cable held in the hole of the guide portion, the second inner wall is provided across an area from the depth of the vicinity of the location of contact between the crimping portion and the cable held in the hole of the guide portion to a depth of a vicinity of a tip end of the crimping portion fitted in the guide portion, and the boundary portion is formed at a position corresponding to a position of the tip end of the crimping portion at the time of contact of the crimping portion with the cable in the middle of fitting of the crimping portion in the guide portion.

7. The cable holding member according to claim 5, wherein the first inner wall is provided across an area from an inlet of the guide portion to a depth of a location of contact between the crimping portion and the cable held in the hole of the guide portion, the second inner wall is provided across an area from the depth of the location of contact between the crimping portion and the cable held in the hole of the guide portion to a depth of a tip end of the crimping portion fitted in the guide portion, and the boundary portion is formed at a position corresponding to a position of the tip end of the crimping portion at the time of contact of the crimping portion with the cable in the middle of fitting of the crimping portion in the guide portion.

8. A cable holding device comprising:

a housing; and a cable holding member, wherein the housing includes a terminal having a crimping portion, the cable holding member includes an opening, a through-hole, an insertion hole, and a guide portion, the opening is formed in a first surface of the cable holding member, the through-hole is configured to hold a cable with the cable inserted from the first surface to a second surface, which faces the first surface, of the cable holding member through the opening, the insertion hole is formed in a third surface of the cable holding member parallel with a cable insertion direction, communicates with the through-hole, and is configured such that the crimping portion is insertable into the cable holding member through the insertion hole, the guide portion is provided in the insertion hole, has such a recessed shape that the crimping portion inserted into the insertion hole is fittable therein, and has a hole in which the cable is insertable and holdable therein, and an inner wall of the guide portion includes a first inner wall, a second inner wall provided on a far side with respect to the first inner wall in the insertion hole, and a boundary portion formed between the first inner wall and the second inner wall, a horizontal width of the second inner wall is set greater than a first horizontal width of the crimping portion when the crimping portion does not crimp the cable, such that, in a state in which the crimping portion is fitted in the guide portion without the cable holding member holding the cables, the crimping portion does not contact the second inner wall, tip ends of the crimping portion are configured to open in an outward direction when the crimping portion crimps the cable in a state in which the cable holding member holds the cable to have a second horizontal width of the crimping portion greater than the first horizontal width of the crimping portion, the horizontal width of the second inner wall is set smaller than a horizontal width of the first inner wall such that the second inner wall contacts the crimping portion and restricts expansion of the second horizontal width of the crimping portion when the crimping portion crimps the cable in a state in which the cable holding member holds the cable, and the boundary portion is an inclined portion having an inclination with respect to the first inner wall such that a horizontal width of the boundary portion gradually decreases from the horizontal width of the first inner wall to the horizontal width of the second inner wall.

* * * * *